US010637310B2

(12) United States Patent
Matsumoto et al.

(10) Patent No.: US 10,637,310 B2
(45) Date of Patent: Apr. 28, 2020

(54) SYNCHRONOUS RELUCTANCE TYPE ROTARY ELECTRIC MACHINE

(71) Applicants: Toshiba Industrial Products and Systems Corporation, Kawasaki-shi (JP); Toshiba Infrastructure Systems & Solutions Corporation, Kawasaki-shi (JP)

(72) Inventors: Masaaki Matsumoto, Mie-gun (JP); Takashi Araki, Mie-gun (JP); Yuji Yamamoto, Mie-gun (JP); Katsutoku Takeuchi, Kokubunji (JP); Makoto Matsushita, Fuchu (JP); Toshio Hasebe, Hachioji (JP)

(73) Assignees: Toshiba Industrial Products and Systems Corporation, Kawasaki-shi (JP); Toshiba Infrastructure Systems & Solutions Corporation, Kawasaki-shi (JP)

( * ) Notice: Subject to any disclaimer, the term of this patent is extended or adjusted under 35 U.S.C. 154(b) by 0 days.

(21) Appl. No.: 16/373,678

(22) Filed: Apr. 3, 2019

(65) Prior Publication Data

US 2019/0229567 A1 Jul. 25, 2019

Related U.S. Application Data

(63) Continuation of application No. PCT/JP2017/036281, filed on Oct. 5, 2017.

(30) Foreign Application Priority Data

Oct. 7, 2016 (JP) ................................. 2016-199228

(51) Int. Cl.
*H02K 19/24* (2006.01)
*H02K 1/27* (2006.01)
(Continued)

(52) U.S. Cl.
CPC ............. *H02K 1/276* (2013.01); *H02K 1/246* (2013.01); *H02K 19/10* (2013.01); *H02K 19/103* (2013.01);
(Continued)

(58) Field of Classification Search
CPC ..................................................... H02K 1/2766
See application file for complete search history.

(56) References Cited

U.S. PATENT DOCUMENTS 6,917,133 B2 * 7/2005 Koharagi ............. H02K 1/2766
310/156.48
7,436,095 B2 * 10/2008 Aydin .................. H02K 1/2766
310/156.53
(Continued)

FOREIGN PATENT DOCUMENTS

JP      9-331661      12/1997
JP      2006-325297   11/2006
(Continued)

OTHER PUBLICATIONS

International Search Report dated Dec. 26, 2017 in PCT/JP2017/036281, filed on Oct. 5, 2017(with English Translation).

*Primary Examiner* — Dang D Le
(74) *Attorney, Agent, or Firm* — Oblon, McClelland, Maier & Neustadt, L.L.P.

(57) ABSTRACT

A synchronous reluctance type rotary electric machine of an embodiment has a rotor core. The rotor core includes a plurality of poles, multi-layered hollow parts having a convex shape toward a side radially inward formed for each pole in cross section, and a bridge formed between each of the hollow parts and an outer circumferential surface thereof. When a boundary between two adjacent poles is a
(Continued)

pole boundary, a groove is formed on at least one of both sides sandwiching the pole boundary at positions other than on the pole boundary on the outer circumferential surface of the rotor core.

4 Claims, 6 Drawing Sheets

(51) Int. Cl.
*H02K 23/40* (2006.01)
*H02K 19/10* (2006.01)
*H02K 1/24* (2006.01)

(52) U.S. Cl.
CPC ........... *H02K 19/24* (2013.01); *H02K 23/405* (2013.01); *H02K 2213/03* (2013.01)

(56) References Cited

U.S. PATENT DOCUMENTS

| | | | | |
|---|---|---|---|---|
| 7,843,101 B2* | 11/2010 | Ito | ........................ | H02K 1/2766 310/156.46 |
| 7,902,711 B2* | 3/2011 | Blissenbach | ......... | H02K 1/2766 310/156.53 |
| 7,960,886 B2* | 6/2011 | Miura | .................. | H02K 1/2766 310/156.57 |
| 8,598,763 B2* | 12/2013 | Aota | .................... | H02K 1/2766 310/156.53 |
| 8,917,005 B2* | 12/2014 | Rahman | ............... | H02K 1/2766 310/156.53 |
| 2019/0199150 A1* | 6/2019 | Cesa | .................... | H02K 1/2766 |

FOREIGN PATENT DOCUMENTS

| | | |
|---|---|---|
| JP | 2013-236418 | 11/2013 |
| JP | 2014-176263 | 9/2014 |
| WO | WO 2016/021651 A1 | 2/2016 |

* cited by examiner

SYNCHRONOUS RELUCTANCE TYPE ROTARY ELECTRIC MACHINE

CROSS-REFERENCE TO RELATED APPLICATIONS

This application is a continuation of International Application No. PCT/JP2017/036281, filed Oct. 5, 2017, which is based upon and claims the benefit of priority from Japanese Patent Application No. 2016-199228, filed on Oct. 7, 2016; the entire contents of which are incorporated herein by reference.

FIELD

Embodiments described herein relate generally to a synchronous reluctance type rotary electric machine.

BACKGROUND

A synchronous reluctance type rotary electric machine includes a rotor and a stator. The rotor includes a shaft rotatably supported and extending in an axial direction at a center of the rotating shaft, and a rotor core externally fitted and fixed to the shaft. The stator includes a stator core having a plurality of teeth disposed on an outer circumference of the rotor core to be spaced apart from the rotor core and disposed to be spaced apart from each other in a circumferential direction, and multipole multiphase armature windings respectively wound around the plurality of teeth.

Multi-layered hollow parts having a convex shape toward a side radially inward are formed for each pole in the rotor core. When the hollow parts are formed in this manner, a direction in which magnetic flux easily flows and a direction in which magnetic flux does not easily flow are formed in the rotor core. Thus, the synchronous reluctance type rotary electric machine rotates the shaft using a reluctance torque generated by the hollow parts.

Incidentally, it is conceivable that synchronous reluctance type rotary electric machines be applied in various fields, and thus yet higher output and reduction in size are required. Due to this, synchronous reluctance type rotary electric machines are desired to have a higher capacity and a higher rotation speed. On the other hand, when hollow parts are formed in a rotor core, the rotor core is likely to be deformed. Therefore, when the rotor core is rotated at a high-speed, there is a likelihood that the rotor core will be deformed by a centrifugal force generated by the high-speed rotation.

Here, when a thickness at a portion called a bridge formed between both ends in a longitudinal direction of the hollow part and an outer circumferential surface of the rotor core is set to be thick, a rotor core can be made difficult to deform. However, when a thickness of the bridge is set to be thick, there is a likelihood of generating magnetic flux leakage at the bridge portion (magnetic circuit). For this reason, a desired reluctance torque is not easily obtained, and there is a likelihood that torque characteristics of the synchronous reluctance type rotary electric machine will deteriorate.

DETAILED DESCRIPTION

A synchronous reluctance type rotary electric machine of an embodiment has a rotor core. The rotor core includes a plurality of poles, multi-layered hollow parts having a convex shape toward a side radially inward formed for each pole in cross section, and a bridge formed between each of the hollow parts and an outer circumferential surface thereof. When a boundary between two adjacent poles is a pole boundary, a groove is formed on at least one of both ends sandwiching the pole boundary at positions other than on the pole boundary on the outer circumferential surface of the rotor core.

Hereinafter, a synchronous reluctance type rotary electric machine of an embodiment will be described with reference to the drawings.

Figure 1:
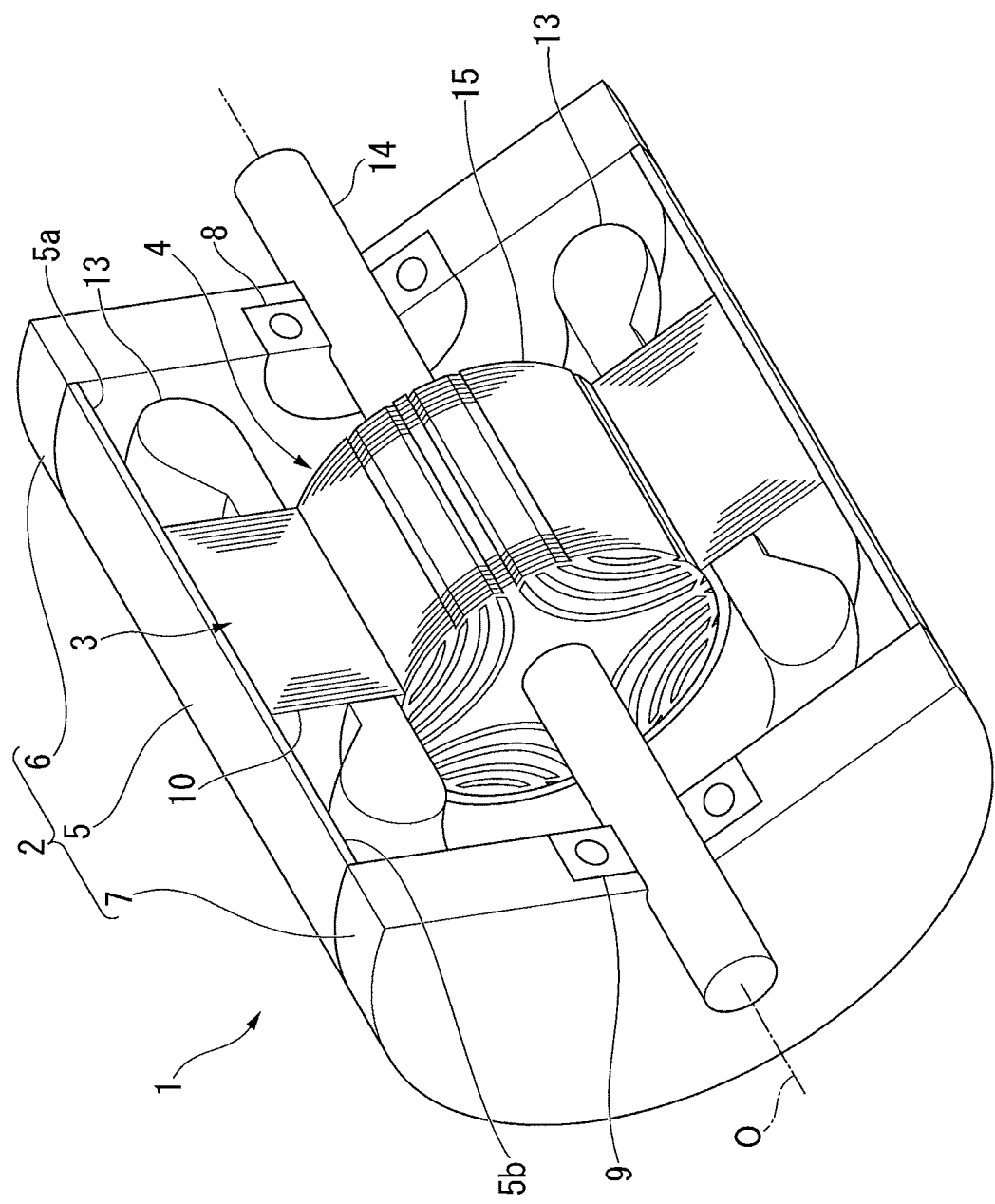
FIG. 1 is a partial cross-sectional perspective view showing a synchronous reluctance type rotary electric machine according to an embodiment.

FIG. 1 is a partial cross-sectional perspective view illustrating a synchronous reluctance type rotary electric machine (hereinafter simply referred to as a rotary electric machine) 1.

As shown in FIG. 1, the rotary electric machine 1 includes a housing 2, a stator 3 fixed in the housing 2, and a rotor 4 supported to be rotatable around a rotation axis O in the housing 2. In the following description, a direction parallel to the rotation axis O will be simply referred to as an axial direction, a direction of revolving around the rotation axis O will be simply referred to as a circumferential direction, and a radial direction perpendicular to the rotation axis O will be simply referred to as a radial direction.

The housing 2 includes a substantially cylindrical frame 5 and bearing brackets 6 and 7 which close openings 5a and 5b at both ends in the axial direction of the frame 5. Each of the bearing brackets 6 and 7 is formed in substantially a disc shape. Bearings 8 and 9 for rotatably supporting the rotor 4 are respectively provided substantially at centers in the radial direction of the bearing brackets 6 and 7.

Figure 2:
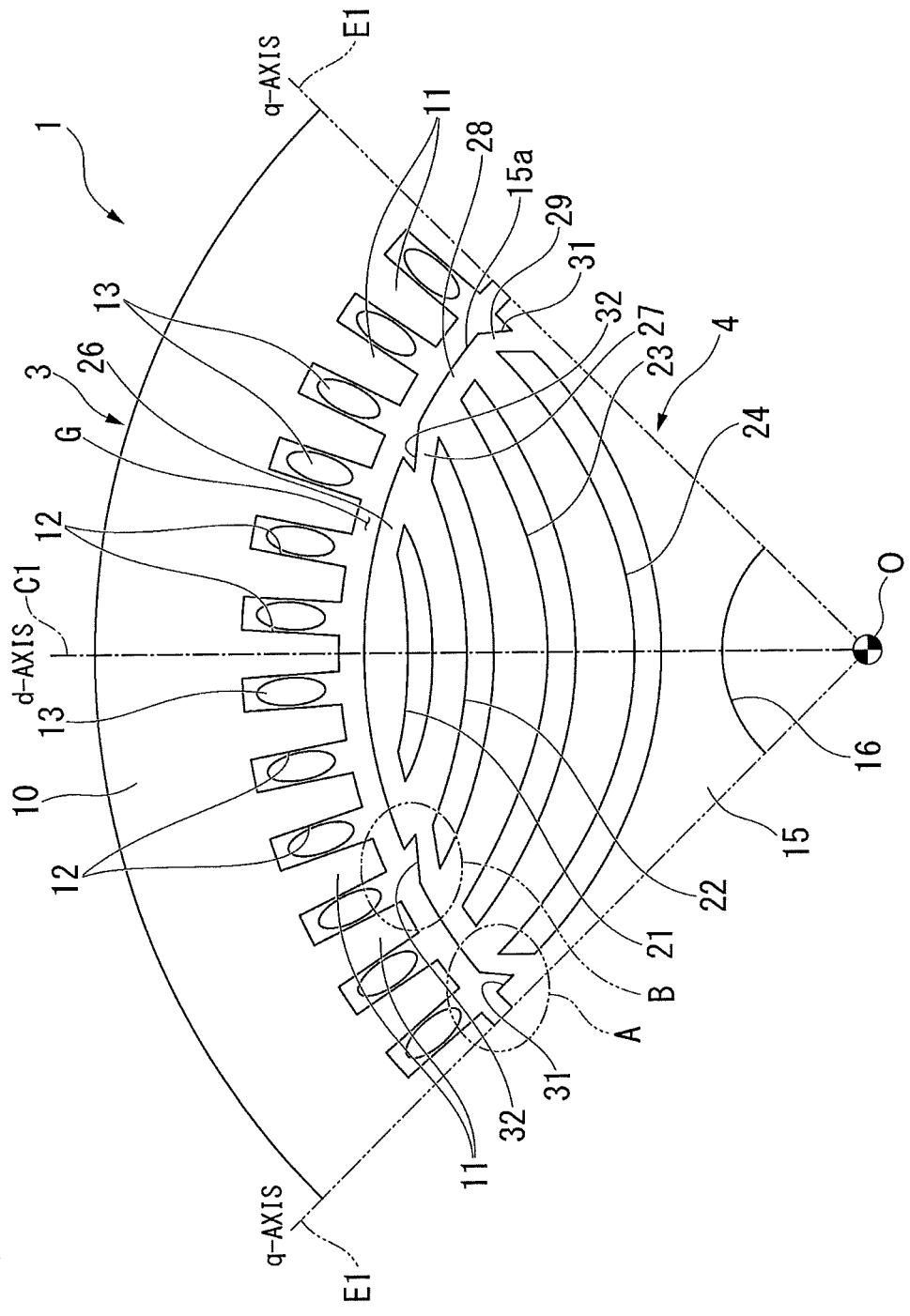
FIG. 2 is a cross-sectional view perpendicular to a rotation axis showing a configuration of a portion of the rotary electric machine of the embodiment.

FIG. 2 is a cross-sectional view perpendicular to the rotation axis O illustrating a configuration of a portion of the rotary electric machine 1. In FIG. 2, a quarter sector of the rotary electric machine 1, that is, only a quarter-circumference circumferential angular region is shown.

As shown in FIGS. 1 and 2, the stator 3 includes a substantially cylindrical stator core 10. An outer circumferential surface of the stator core 10 is internally fitted and fixed to an inner circumferential surface of the frame 5. A radial center of the stator core 10 coincides with the rotation axis O.

Also, the stator core 10 can be formed by laminating a plurality of electromagnetic steel sheets or by compression-molding a soft magnetic powder. On an inner circumferential surface of the stator core 10, a plurality of teeth 11 protruding toward the rotation axis O and disposed at regular intervals in the circumferential direction are integrally molded. The teeth 11 are formed to have a substantially rectangular cross section. A plurality of slots 12 are formed at regular intervals in the circumferential direction so that one slot 12 is disposed between adjacent teeth 11. Through these slots 12, armature windings 13 are wound around each of the teeth 11.

Figure 3:
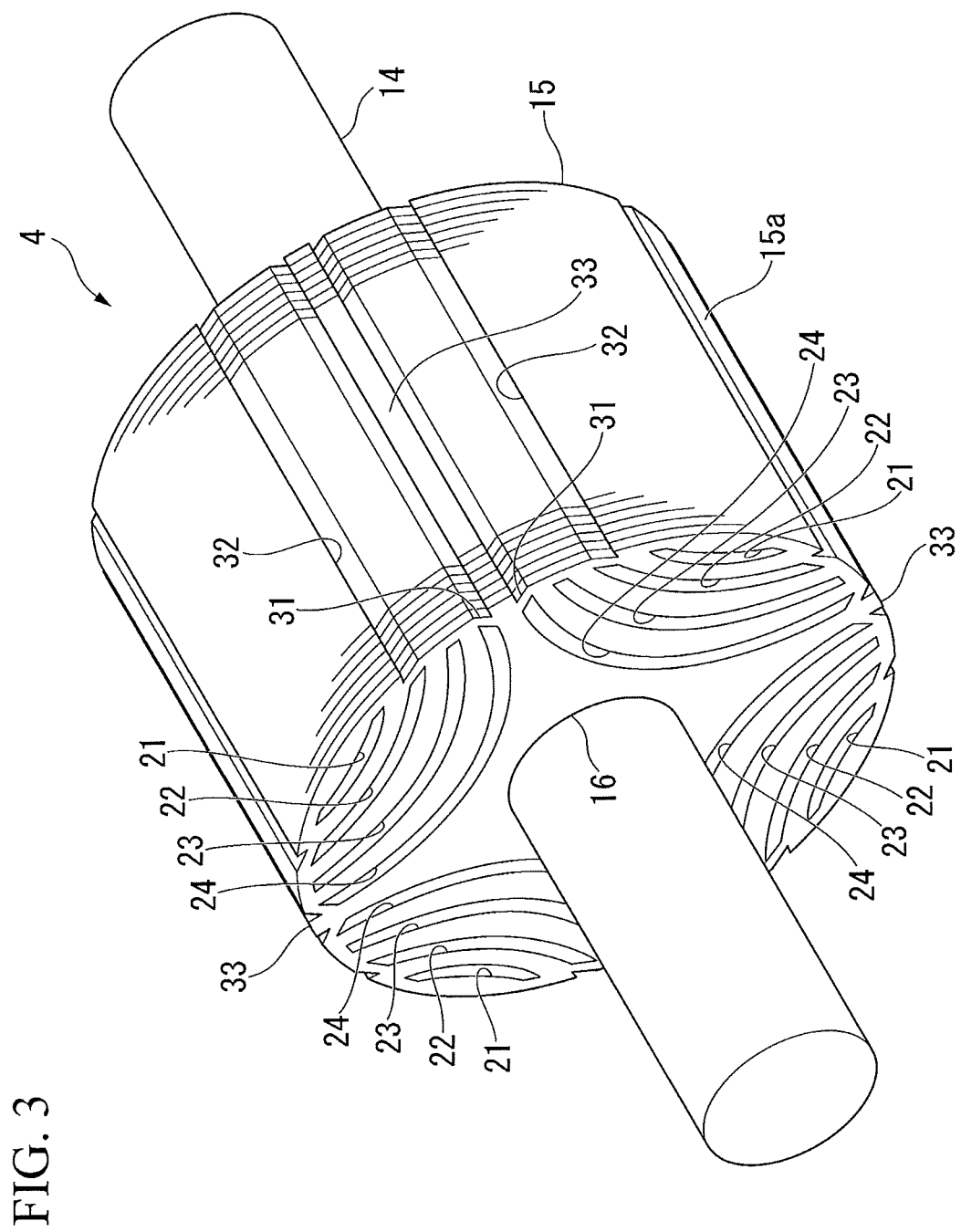
FIG. 3 is a perspective view showing a rotor according to the embodiment.

FIG. 3 is a perspective view illustrating the rotor 4.

As shown in FIGS. 2 and 3, the rotor 4 is disposed on a side radially inward from the stator core 10. The rotor 4 includes a rotating shaft 14 extending in the axial direction and a substantially columnar rotor core 15 externally fitted and fixed to the rotating shaft 14.

The rotor core 15 can be formed by laminating a plurality of electromagnetic steel sheets or by compression-molding a soft magnetic powder. An outer diameter of the rotor core 15 is set such that a predetermined air gap G is formed between each of the teeth 11 and the rotor core 15 facing each other in the radial direction. Also, a through hole 16 penetrating in the axial direction is formed at a radial center of the rotor core 15. The rotating shaft 14 is press-fitted or the like to the through hole 16, and thereby the rotating shaft 14 and the rotor core 15 rotate integrally.

Further, four layers of hollow parts (flux barriers) 21, 22, 23, and 24 (a first hollow part 21, a second hollow part 22, a third hollow part 23, and a fourth hollow part 24) are formed to be aligned in the radial direction in each of the quarter-circumference circumferential angular region of the rotor core 15. That is, the first hollow part 21 is formed on an outermost side in the radial direction, and the second hollow part 22, the third hollow part 23, and the fourth hollow part 24 are aligned in this order from the first hollow part 21 toward the side radially inward. Thus, the fourth hollow part 24 is disposed on the side furthest inward in the radial direction.

Also, each of the hollow parts 21 to 24 is formed to follow a flow of a magnetic flux formed when the armature windings 13 are energized. That is, each of the hollow parts 21 to 24 is formed to be curved so that a center thereof in the circumferential direction is positioned furthest inward in the radial direction (to have a convex shape toward the side radially inward). Thereby, a direction in which the magnetic flux easily flows and a direction in which the magnetic flux does not easily flow are formed in the rotor core 15. In the following description, a longitudinal direction of each of the hollow parts 21, 22, 23, and 24 when viewed from a direction of the rotation axis O (substantially a lateral direction in FIG. 2) will be simply referred to as a longitudinal direction of the hollow parts 21, 22, 23, and 24 in some cases.

Here, in the present embodiment, a direction in which the magnetic flux easily flows is referred to as a q-axis. Also, a direction extending in the radial direction that is electrically and magnetically perpendicular to the q axis is referred to as a d-axis. That is, each of the hollow parts 21 to 24 forms a multilayer structure in the radial direction along the d-axis.

More specifically, regarding the q-axis direction in the rotor core 15, a direction in which a flow of the magnetic flux is not interrupted by each of the hollow parts 21 to 24 is referred to as the q-axis. That is, a positive magnetic potential (for example, an N pole of a magnet is brought close thereto) is given to an arbitrary circumferential angular position on an outer circumferential surface 15a of the rotor core 15. Also, a negative magnetic potential (for example, an S pole of a magnet is brought close thereto) is given to another arbitrary circumferential angular position shifted by one pole (90 degrees in mechanical angle in the present embodiment) with respect to the positive magnetic potential. Then, when positions of such positive magnetic potential and negative magnetic potential are shifted from each other in the circumferential direction, a direction from the rotation axis O toward an arbitrary position when a majority of the magnetic flux flows is defined as the q-axis. Then, the longitudinal direction of each of the hollow parts 21 to 24 is the q-axis.

On the other hand, a direction in which a flow of the magnetic flux is interrupted by each of the hollow parts 21 to 24, that is, a direction magnetically perpendicular to the q-axis is referred to as the d-axis. In the present embodiment, a direction parallel to a direction in which two rotor core portions separated into a region close to the rotation axis O and a region away from the rotation axis O by each of the hollow parts 21 to 24 face each other is the d-axis. Also, when the hollow parts 21 to 24 are formed in multiple layers (four layers in the present embodiment) as in the present embodiment, a direction in which the layers overlap is the d-axis. In the present embodiment, the d-axis is not limited to being electrically and magnetically perpendicular to the q-axis and may intersect the q-axis with a certain degree of angular width (for example, about 10 degrees in mechanical angle) from the perpendicular angle.

As described above, the rotor core 15 is configured to have four poles, and four layers of the hollow parts 21 to 24 are formed for each pole (a quarter-circumference circumferential angular region of the rotor core 15). Then, one pole is a region between the q-axes.

In the following description, the d-axis is referred to as a pole center C1. The q-axis (both ends in the circumferential direction of the quarter-circumference circumferential angular region) serves as a boundary between two adjacent poles and is therefore referred to as a pole boundary E1.

That is, each of the hollow parts 21 to 24 is formed to be curved toward the side radially inward so that the pole center C1 thereon is positioned furthest inward in the radial direction. Also, each of the hollow parts 21 to 24 is formed to be curved so that both ends thereof in a longitudinal direction are respectively positioned on outer circumferential portions of the rotor core 15 when viewed from the axial direction. Then, each of the hollow parts 21 to 24 is formed to follow the pole boundary E1 as a position thereon becomes closer to both ends in the longitudinal direction and to be perpendicular to the pole center C1 as a position thereof becomes closer to a center in the longitudinal direction.

Bridges 26, 27, 28, and 29 (a first bridge 26, a second bridge 27, a third bridge 28, and a fourth bridge 29) are respectively formed between both ends in the longitudinal direction of each of the hollow parts 21 to 24 and the outer circumferential surface 15a of the rotor core 15 in the q-axis direction.

The bridges 26, 27, 28, and 29 means those formed close to the outer circumferential portion of the rotor core 15 in each of the hollow parts 21 to 24 in a range in which thicknesses thereof rapidly change (this range is referred to as a bridge range).

A first groove 31 is formed over the entire outer circumferential surface 15a of the rotor core 15 in the axial direction in two fourth bridges 29 which are in a lowermost layer among the four bridges 26 to 29. Also, a second groove 32 is formed over the entire outer circumferential surface 15a of the rotor core 15 in the axial direction in two second bridges 27 positioned next to bridges which are in an uppermost layer (the first bridges 26).

Figure 4:
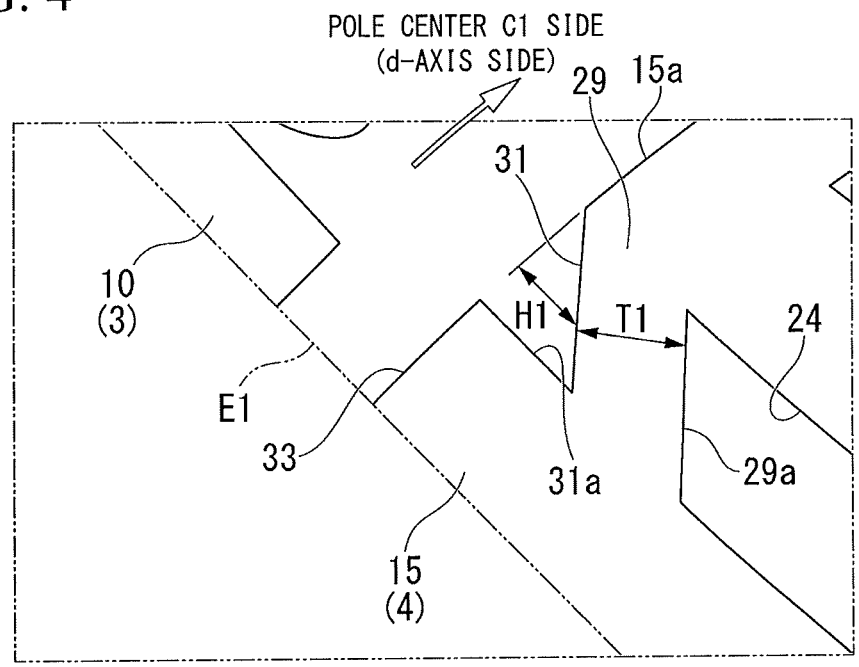
FIG. 4 is an enlarged view of a portion A of FIG. 2.

FIG. 4 is an enlarged view of a portion A of FIG. 2.

As shown in FIG. 4, the first groove 31 is formed within a range of the fourth bridge 29. A groove depth H1 of the first groove 31 is set to gradually increase toward the pole boundary E1. Also, the fourth bridge 29 is formed such that a side surface 29a close to the fourth hollow part 24 is positioned radially inward toward the pole boundary E1. Thereby, a thickness T1 in the q-axis direction of the fourth bridge 29 is formed to be substantially constant throughout. Also, the first groove 31 is formed such that an inner side surface 31a close to the pole boundary E1 is substantially parallel to the pole boundary E1.

Thus, as shown in detail in FIG. 3, the first groove 31 is formed on both ends sandwiching the pole boundary E1 at positions other than on the pole boundary E1 on the outer circumferential surface 15a of the rotor core 15. In other words, a ridge part 33 extending in the axial direction is formed on the pole boundary E1 and the first groove 31 is formed on both circumferential sides of the ridge part 33 on the outer circumferential surface 15a of the rotor core 15. Since the inner surface 31a of the first groove 31 is substantially parallel to the pole boundary E1, a cross-sectional shape of the ridge part 33 perpendicular to the axial direction has substantially a rectangular shape.

Figure 5:
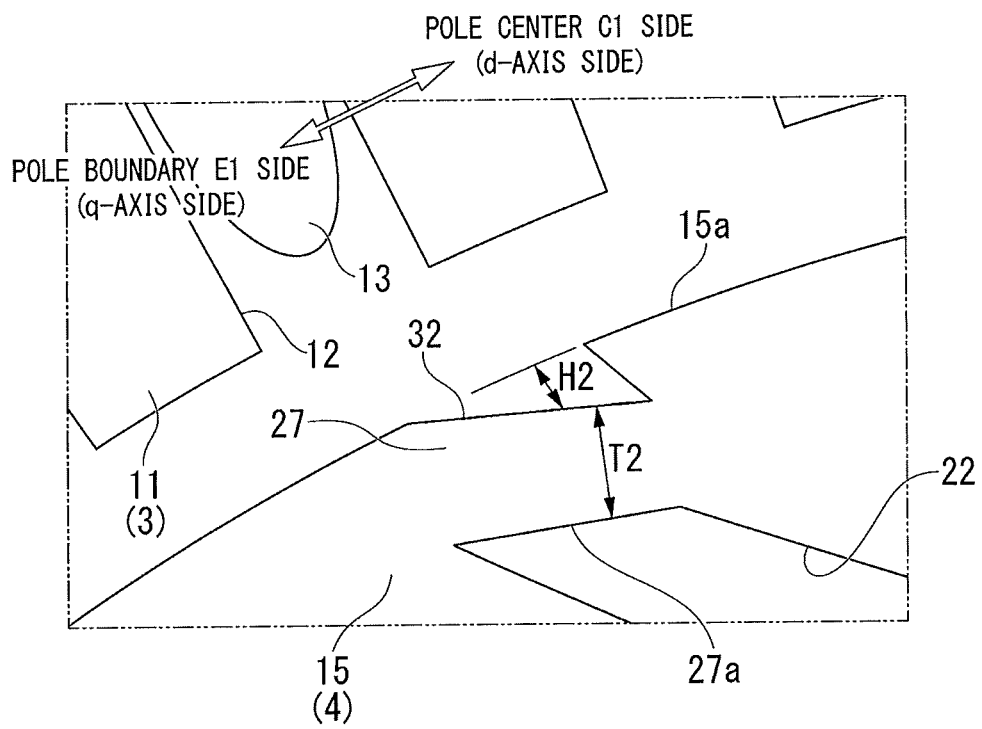
FIG. 5 is an enlarged view of a portion B of FIG. 2.

FIG. 5 is an enlarged view of a portion B of FIG. 2.

As shown in FIG. 5, the second groove 32 is formed on the second bridge 27. A groove depth H2 of the second groove 32 is set to gradually increase toward the pole center C1. Also, the second bridge 27 is formed such that a side surface 27a close to the second hollow part 22 is positioned radially inward toward the pole center C1. Thereby, a thickness T2 in the q-axis direction of the second bridge 27 is formed to be substantially constant throughout.

Further, thicknesses of the first bridge 26 and the third bridge 28 in the q-axis direction are also formed to be substantially constant throughout.

Incidentally, each of the bridges 26 to 29 is a portion for making it difficult for the rotor core 15 to be deformed and is also a portion which causes magnetic flux leakage.

Hereinafter, a stress applied to the bridges 26 to 29 in a rotor core (hereinafter referred to as a conventional rotor core) in which the second groove 32 and the first groove 31 are not respectively formed in the second bridge 27 and the fourth bridge 29 will be described. Further, since the conventional rotor core is the same as the rotor core 15 of the present embodiment except for a configuration in which each of the grooves 31 and 32 is not formed, a description will be provided assuming that parts in the conventional rotor core the same as those in the rotor core 15 of the present embodiment are denoted by the same reference signs so that the description can be more easily understood.

Figure 6:
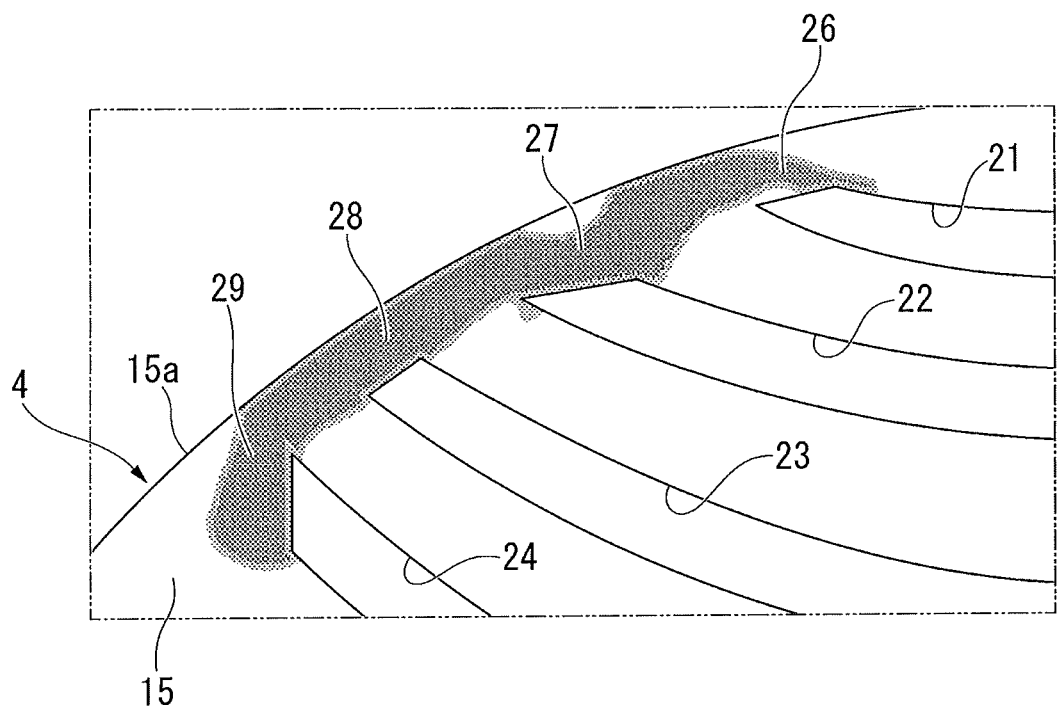
FIG. 6 is a distribution diagram for a stress applied to a rotor core of the embodiment.

FIG. 6 is a distribution diagram for a stress applied to the rotor core 15 when the conventional rotor core 15 is rotated at a high speed.

As shown in dotted hatching in FIG. 6, when the conventional rotor core 15 is rotated at a high speed, a stress is applied to the bridges 26 to 29. This is because a centrifugal force applied to the rotor core 15 between each of the hollow parts 21 to 24 when the rotor core is rotated is received by each of the bridge 26 to 29. Here, it can be confirmed that hardly any stress due to high-speed rotation of the rotor core 15 is applied to a portion corresponding to the first groove 31 and a portion corresponding to the second groove 32 (for both, refer to FIG. 2) of the present embodiment.

That is, also when the first groove 31 and the second groove 32 are formed, the difficulty in deforming the rotor core 15 hardly changes. In addition to this, magnetic saturation occurs easily in the second bridge 27 and the fourth bridge 29 according to the first groove 31 and the second groove 32 being formed, and magnetic flux leakage can be suppressed.

Therefore, according to the above-described embodiment, the rotor core 15 can be made difficult to deform and torque characteristics of the rotary electric machine 1 can be improved.

Also, the first groove 31 is formed on both ends sandwiching the pole boundary E1 at positions other than on the pole boundary E1 on the outer circumferential surface 15a of the rotor core 15. In other words, the ridge part 33 extending in the axial direction is formed on the pole boundary E1 and the first groove 31 is formed on both circumferential sides of the ridge part 33 on the outer circumferential surface 15a of the rotor core 15. Therefore, sufficient saliency (salient pole ratio, reluctance ratio between the d-axis and the q-axis) of the rotor core 15 can be secured while forming the first groove 31. Therefore, the torque characteristics of the rotary electric machine 1 can be reliably improved.

Further, the first groove 31 and the second groove 32 are formed over the entire outer circumferential surface 15a of the rotor core 15 in the axial direction. Therefore, the magnetic flux leakage at the second bridge 27 and the fourth bridge 29 can be reliably suppressed.

Also, a sufficient strength around the fourth bridge 29 in the rotor core 15 can be secured by forming the first groove 31 within the range of the fourth bridge 29. Therefore, the rotor core 15 can be more reliably made difficult to deform while suppressing magnetic flux leakage.

Further, in the above-described embodiment, a case in which the first groove 31 is formed within the range of the fourth bridge 29 has been described. However, it is not limited thereto, and the first groove 31 may be formed beyond the range of the fourth bridge 29.

Also, a case in which the first groove 31 is formed such that the inner side surface 31a close to the pole boundary E1 is substantially parallel to the pole boundary E1 has been described. However, it is not limited thereto, and the inner side surface 31a may be formed to be inclined with respect to the pole boundary E1. Accordingly, the cross-sectional shape of the ridge part 33 perpendicular to the axial direction is not limited to a rectangular shape, and for example, the cross-sectional shape thereof perpendicular to the axial direction may be a trapezoidal shape that is tapered toward an outer side in the radial direction.

When the ridge part 33 is formed as described above, the fourth bridge 29 can be more reliably made difficult to deform and sufficient saliency of the rotor core 15 can be secured.

Further, a case in which the first groove 31 is formed on both sides sandwiching the pole boundary E1 at positions other than on the pole boundary E1 on the outer circumferential surface 15a of the rotor core 15 has been described. However, it is not limited thereto, and the first groove 31 need only be formed on at least one of both sides sandwiching the pole boundary E1. In this case, although the ridge part 33 is not formed on the pole boundary E1, since the magnetic flux leakage of the fourth bridge 29 in which the first groove 31 is formed can be suppressed, the rotor core 15 can be made difficult to deform and torque characteristics of the rotary electric machine 1 can be improved.

Figure 7:
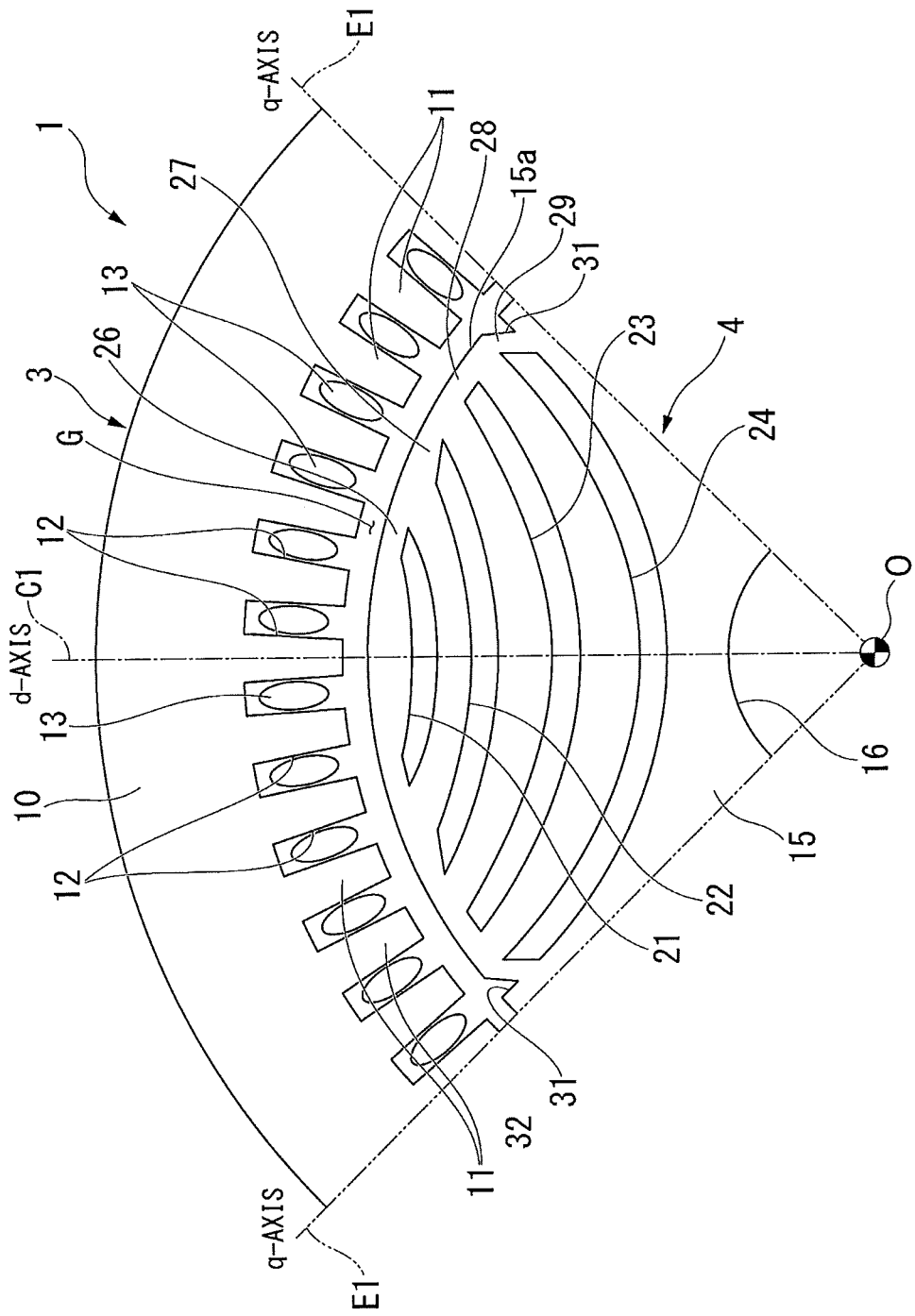
FIG. 7 is a cross-sectional view perpendicular to a rotation axis showing a configuration of a portion of a rotary electric machine of a modified example of the embodiment.

Also, in the above-described embodiment, a case in which the second groove 32 is formed on the second bridge 27 in addition to the first groove 31 formed on the fourth bridge 29 on the outer circumferential surface 15a of the rotor core 15 has been described. However, it is not limited thereto, and the second groove 32 may not be formed in the second bridge 27 as shown in FIG. 7. Even with such a configuration as above, since the magnetic flux leakage of the fourth bridge 29 can be suppressed, the rotor core 15 can be made difficult to deform and torque characteristics of the rotary electric machine 1 can be improved.

Further, a case in which the first groove 31 and the second groove 32 are formed over the entire rotor core 15 in the axial direction has been described. However, it is not limited thereto, and a plurality of first grooves 31 and second grooves may be formed at intervals in the axial direction. Even in such a case, the magnetic flux leakage of the fourth bridge 29 and the second bridge 27 can be reduced compared to a case in which the first groove 31 and the second groove are not formed.

Further, in the above-described embodiment, a case in which the rotor core 15 is configured to have four poles has been described. However, it is not limited thereto, and the rotor core 15 may be configured to have four or more poles.

Further, a case in which the rotor core 15 has four layers of hollow parts 21 to 24 formed in each quarter-circumference circumferential angular region (for each pole) has been described. However, it is not limited thereto, and a plurality of hollow parts with four or more layers may be formed. Even in the case in which four or more layers of hollow parts are formed, a groove corresponding to the first groove 31 is formed on at least one of both sides sandwiching the pole boundary E1 at positions other than on the pole boundary E1. Also, it is preferable to form a groove corresponding to the second groove 32 on the outer circumferential surface 15a of a bridge (second bridge 27) positioned next to a bridge closest to the pole center C1 (first bridge 26).

Also, in the above-described embodiment, a case in which each of the hollow parts 21 to 24 is formed to be curved so that a center thereof in the circumferential direction is positioned furthest inward in the radial direction (to have a convex shape toward the side radially inward) has been described. However, it is not limited thereto, and each of the hollow parts 21 to 24 need only be formed in a convex shape toward the side radially inward. That is, each of the hollow parts 21 to 24 may not be formed to be curved.

According to at least any one embodiment described above, sufficient saliency of the rotor core 15 can be secured while suppressing the magnetic flux leakage in the fourth bridge 29 by forming the first groove 31 on both sides sandwiching the pole boundary E1 at positions other than on the pole boundary E1 on the outer circumferential surface 15a of the rotor core 15. Therefore, torque characteristics of the rotary electric machine 1 can be reliably improved.

Also, the first groove 31 is formed such that the groove depth H1 gradually increases toward the pole boundary E1. Further, the second groove 32 formed on the second bridge 27 is formed such that the groove depth H2 gradually increases toward the pole center C1. Therefore, torque characteristics of the rotary electric machine 1 can be improved while making the rotor core 15 difficult to deform.

Also, the first groove 31 and the second groove 32 are formed over the entire outer circumferential surface 15a of the rotor core 15 in the axial direction. Therefore, the magnetic flux leakage in the second bridge 27 and the fourth bridge 29 can be reliably suppressed.

Further, a sufficient strength around the fourth bridge 29 in the rotor core 15 can be secured by forming the first groove 31 within the range of the fourth bridge 29. Therefore, the rotor core 15 can be more reliably made difficult to deform while suppressing magnetic flux leakage.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and there equivalents are intended to cover such forms or modifications as would fall within the scope and spirit of the invention.

What is claimed is:

1. A synchronous reluctance type rotary electric machine comprising:

a rotor core including a plurality of poles, multi-layered hollow parts having a convex shape toward a side radially inward formed for each pole in cross section, and a bridge formed between each of the hollow parts and an outer circumferential surface thereof, wherein, when a boundary between two adjacent poles is a pole boundary, a groove is formed on at least one of both sides sandwiching the pole boundary at positions other than on the pole boundary on the outer circumferential surface of the rotor core, and when a center in a circumferential direction of one pole is a pole center, a second groove is formed on an outer circumferential surface of the bridge positioned next to the bridge closest to the pole center, and a groove depth of the second groove is set to gradually increase toward the pole center.

2. The synchronous reluctance type rotary electric machine according to claim 1, wherein the groove is formed over the entire rotor core in a direction of a rotation axis.

3. The synchronous reluctance type rotary electric machine according to claim 1, wherein the groove is formed within a range of the bridge at a position closest to the pole boundary.

4. The synchronous reluctance type rotary electric machine according to claim 1, wherein a groove depth of the groove is set to gradually increase toward the pole boundary.

* * * * *